United States Patent
Cheung et al.

(10) Patent No.: US 8,060,929 B2
(45) Date of Patent: Nov. 15, 2011

(54) METHOD AND SYSTEM FOR PROVIDING SECURITY TO PROCESSORS

(75) Inventors: Hugo Cheung, Tucson, AZ (US); Lu Yuan, Tucson, AZ (US); Terence Chiu, Tucson, AZ (US); Bolanle Oladapo Onodipe, Fort Worth, TX (US)

(73) Assignee: Texas Instruments Incorporated, Dallas, TX (US)

( * ) Notice: Subject to any disclaimer, the term of this patent is extended or adjusted under 35 U.S.C. 154(b) by 64 days.

(21) Appl. No.: 12/563,511

(22) Filed: Sep. 21, 2009

(65) Prior Publication Data

US 2010/0011160 A1    Jan. 14, 2010

Related U.S. Application Data

(63) Continuation of application No. 10/137,005, filed on May 2, 2002, now abandoned.

(60) Provisional application No. 60/288,914, filed on May 4, 2001.

(51) Int. Cl.
  *G06F 7/04* (2006.01)
(52) U.S. Cl. ............... 726/17; 726/16; 726/26; 726/27; 713/300; 713/320
(58) Field of Classification Search .................. None
  See application file for complete search history.

(56) References Cited

U.S. PATENT DOCUMENTS

| 4,209,250 | A |   | 6/1980 | James et al. |
| 4,460,272 | A |   | 7/1984 | Parrini |
| 4,583,196 | A |   | 4/1986 | Koo |
| 6,151,678 | A | * | 11/2000 | Davis ............................. 726/35 |
| 6,160,734 | A | * | 12/2000 | Henderson et al. ...... 365/185.04 |
| 6,412,081 | B1 | * | 6/2002 | Koscal et al. ................... 714/34 |

FOREIGN PATENT DOCUMENTS

| DE | 2109752 | 3/1971 |
| EP | 0614854 | 9/1994 |
| EP | 1058216 | 12/2000 |

\* cited by examiner

*Primary Examiner* — Pramila Parthasarathy
(74) *Attorney, Agent, or Firm* — John J. Patti; Wade J. Brady, III; Frederick J. Telecky, Jr.

(57) ABSTRACT

There are various methods of securing programs and data on a processor. The external address enable pin of the processor is sampled upon a power-on or reset to the processor, to determine whether or not accesses to external memory are allowed. Other changes to the external address enable pin are thereafter ignored. In addition, if it is determined that an internal memory access is occurring, the contents of such an access can be masked to prevent unauthorized viewing of the memory contents via an external memory bus. In addition, a programmable security bit may be set to disable the dumping of flash memory contents, allowing only the erasing of the flash memory.

5 Claims, 3 Drawing Sheets

METHOD AND SYSTEM FOR PROVIDING SECURITY TO PROCESSORS

CROSS-REFERENCE TO RELATED APPLICATIONS

This application is a continuation of U.S. patent application Ser. No. 10/137,005, filed on May 2, 2002, which claims priority from U.S. Provisional Patent Application Ser. No. 60/288,914, filed May 4, 2001. Each application is hereby incorporated by reference for all purposes.

FIELD OF THE INVENTION

The present invention relates to security methods for use in microcontroller-based products. More particularly, the present invention relates to security methods to facilitate the security of programs and data located in microcontroller-based products.

BACKGROUND

The demand for high performance, microcontroller-based products for use in communication and processing applications continues to increase rapidly. As a result, microcontroller-based product manufacturers are typically requiring that the components and devices within these products be regularly improved to meet the design requirements of a myriad of emerging audio, video, and imaging applications.

These microcontroller-based products use various types of processors, such as general purpose microprocessors, for controlling the operation of various digital devices, such as clock radios, microwave ovens, digital video recorders, and the like, and special purpose microprocessors, such as math coprocessors for mathematical computations, or digital signal processors used to manipulate various types of information, including sound, imaging, and video information.

A microcontroller typically includes a central processing unit ("CPU") core to perform the processing functions and a bus interface for communication with the various memory devices as well as external or other peripheral devices.

For the storage of data, the microcontroller may include various types of memory. For example, the microcontroller may include Random Access Memory ("RAM") as well as Read-Only Memory ("ROM"). In addition, the microcontroller may also include flash memory which can be erased and reprogrammed.

For the transmitting and receiving of data between various devices and components, microcontrollers, and other devices utilize various types of serial interfaces. One such type of interface definition typically used is the serial peripheral interface ("SPI"). In addition, for the temporary storage of data, for example, to permit the microcontrollers to manipulate the data before transferring the data through the SPI to another device, the microcontrollers generally utilize one or more buffers. These buffers are configured with the SPI to enable the processors to transmit and receive data to and from the buffers as needed in an application.

Microcontrollers may be produced as self-contained devices. That is, they are produced as products that include a processor as well as a memory containing a program. In some instances, the program may be pre-loaded in the memory, and the processor with program may be purchased as a complete unit. It may not be desirable to have the contents of the program become available to the public, if the entity that created the program wishes to protect its intellectual property in the program.

With reference to FIG. 1, an exemplary microcontroller 100 is illustrated. Microcontroller 100 suitably comprises a central processing unit (CPU) core 102 configured for the processing of data, and a bus interface 104 for communication with the various memory or input and output devices. For the storage of data, microcontroller 100 can comprise various types of memory. For example, microcontroller 100 can comprise an internal CPU static random access memory (SRAM) 106 that can provide very low access time, e.g., as low as 10 nanoseconds. In addition, microcontroller 100 can also include data memory 114 which may also comprise SRAM-type memory, and read-only memory (ROM) 116. Still further, microcontroller 100 can also include flash memory for the programming and storage of data, such as a page of memory 124 comprising, for example, 32 KB of data storage, as well as a smaller configuration of flash memory 126, comprising, for example, 128 kilobits of data storage. For the transmitting and receiving of data between various components, microcontroller 100 may also include a serial peripheral interface (SPI) 110 which can communicate with the CPU memory 106 via direct memory access (DMA) 112, i.e., SPI 110 can transfer data from main memory to a device without passing the data through the CPU.

In addition, microcontroller 100 may also include various input/output devices. For example, an I/O port device 118 can be provided, as well as a breakpoint device 120. Further, microcontroller 100 can also include a system clock 130 for providing the clock cycles for triggering various functions and sequences during operation. Microcontroller 100 may also include a Power On Reset (POR) 128 for use during ramping up of a power supply.

It has been discovered that certain systems, including several systems based on the Intel 8051 microprocessor architecture, as well as other systems based on architectures with similar features, may be vulnerable to various types of security breaches.

For example, there is an External Address Enable pin on the 8051 microprocessor (EAn). In certain configurations, when the voltage at this pin is high, the processor uses internal memory (memory 126 and memory 124, for example) for access to program and data memory. When the voltage at this pin is held low, the processor is able to fetch code from memory locations which are external to microcontroller 100.

Such a feature enables a microcontroller to access larger amounts of code than is available from microcontroller 100 alone. However, the ability to fetch code from external memory locations can be exploited in an unscrupulous manner. For example, an unauthorized user may be able to force EAn to a low state to enable external memory accesses. The unauthorized user could then create a program located in external memory where the program is configured to download the program located on the microcontroller by switching EAn to a high state, a condition which enables reads from internal memory, thus permitting the unauthorized user to read the contents of the internal memory or otherwise access the contents of the internal memory.

Another possible security problem with microcontroller systems is that the input/output ("I/O") ports can be accessed in some instances. For example, if EAn is set high, the internal memory is being accessed, but the data retrieved on the internal memory may be viewable at certain I/O ports. In those situations, although the processor is accessing internal memory, microcontroller 100 outputs those contents of the internal memory to the I/O ports. By monitoring I/O ports, such as the P0 port on the 8051 microprocessor, an unauthorized user may be able to monitor the contents of the internal program and data memory from the I/O port and thus have access to intellectual property.

A further security problem that may be present is the ability to re-program flash memory. A supplier of microcontrollers will typically enable the microcontroller to be programmed by a vendor, so it can be used in a specific application. For example, a company which manufactures power meters may buy microcontroller 100 and program the microcontroller to perform certain functions. The use of flash memory can facilitate the programming because a flash memory is more easily reprogrammed with changes to a desired program. While a ROM may be copied through the use of photography to produce an optical mask, such a technique is not possible with flash memory. However, when the power meter company ships its product to end users, it may not want the program and data used in the power meter to be accessible by, e.g., possible competitors.

When one attempts to program a flash memory, there may be several options available. Certain memory locations or groups of memory locations (such as pages of memory) may be accessed at one time. An additional option that may be used by an unauthorized user to "dump" the contents of the memory in order to determine the contents of the flash memory.

Accordingly, a need exists to solve the above-mentioned potential security problems in microcontrollers and processors.

SUMMARY

A device and method according to the present invention addresses many of the shortcomings of the prior art. In accordance with various aspects of the present invention, an improved security scheme is provided to prevent the unauthorized access to program and data information.

In accordance with an exemplary embodiment, the security method comprises sampling of an external address access pin at startup or reset events such that an unauthorized user is unable to switch from internal memory access to external memory access, in between results/start ups, in order to gain access to information stored in the processor/memory combination.

In accordance with another aspect of the present invention, the security method involves masking data on the input/output ports of the processor such that internal memory accesses cannot be monitored.

In accordance with a further aspect of the present invention, the security method includes a configuration which prevents the dumping or selective reprogramming of the contents of a flash memory.

BRIEF DESCRIPTION OF THE DRAWINGS

A more complete understanding of the present invention may be derived by referring to the detailed description and claims when considered in connection with the Figure, where:

DETAILED DESCRIPTION

Figure 1:
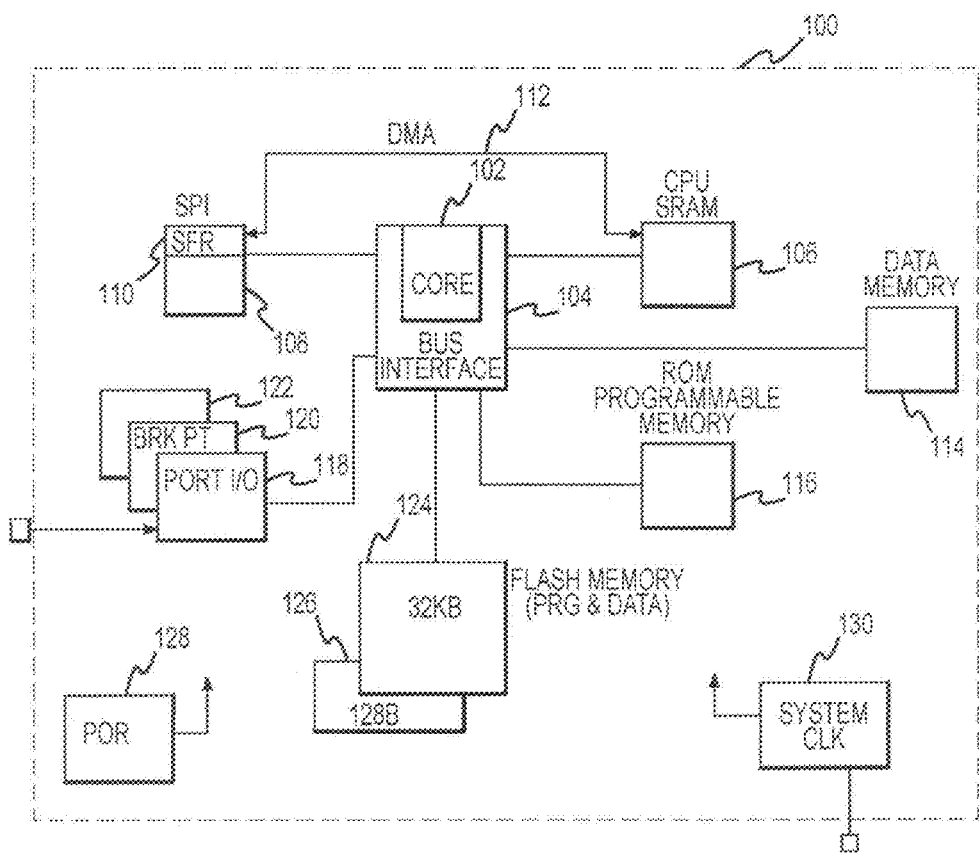
FIG. 1 illustrates a block diagram of an exemplary microcontroller in accordance with an exemplary embodiment of the present invention.

The present invention may be described herein in terms of various functional components and various processing steps. It should be appreciated that such functional components may be realized by a number of hardware or structural components configured to perform the specified functions. For example, the present invention may employ various integrated components, e.g., buffers, voltage and current references, memory components and the like, comprised of various electrical devices, e.g., resistors, transistors, capacitors, diodes or other devices, whose values may be suitably configured for various intended purposes. In addition, the present invention may be practiced in any microprocessor-based application. Further, it should be noted that while various components may be suitably coupled or connected to other components within exemplary circuits, such connections and couplings can be realized by direct connection between components, or by connection through other components and devices located therebetween.

As described above, a security problem involving EAn may exist in certain processors, such as those based on the Intel 8051 architecture. In accordance with one aspect of the present invention, the above-described technique of holding EAn to a low state to read the contents of the memory is prevented from working by partially disabling the operation of EAn.

With additional reference to FIG. 2, this may be accomplished in the following manner. In accordance with an exemplary embodiment, upon the startup (i.e., the powering on) or the reset of the processor (step 202), the processor samples EAn to determine if internal memory or external memory is to be used, i.e., to determine if EAn is enabled (step 204). If external memory is to be accessed, the processor accesses external memory to run the appropriate programs (step 206). In the event internal memory is used, the processor executes the program located in internal memory (step 208). After sampling the value of EAn at power-on or reset, the processor will ignore future changes to the status of EAn and limit memory accesses to the type of memory selected upon power-on or reset (step 210).

It can be seen that a security risk is drastically reduced through the use of such an exemplary scheme. Under the prior art scheme discussed earlier, the typical method of examining the contents of memory is to start the processor running the program located in internal memory such that internal memory is accessible. Then EAn would be changed such that a program located in external memory is running and internal memory is accessible.

In contrast, under an exemplary embodiment of the present invention as discussed above, EAn is only checked upon a power-on or reset. Thus, once a program running from internal memory begins execution, a program running from external memory cannot begin. In a similar manner, once a program is running from external memory, no access to internal memory is allowed, as only one of external memory or internal memory can be accessed.

As described above, another possible security weakness is the ability to monitor the contents of a processor's memory by monitoring the P0 port. An exemplary embodiment of the present invention protects against such a method of hacking by masking port P0 when an internal memory access is detected. This may be accomplished by forcing port P0 to logic level 0 during internal memory accesses. Thus, an unauthorized user will be unable to determine the contents of the memory bus during internal memory accesses.

Figure 3:
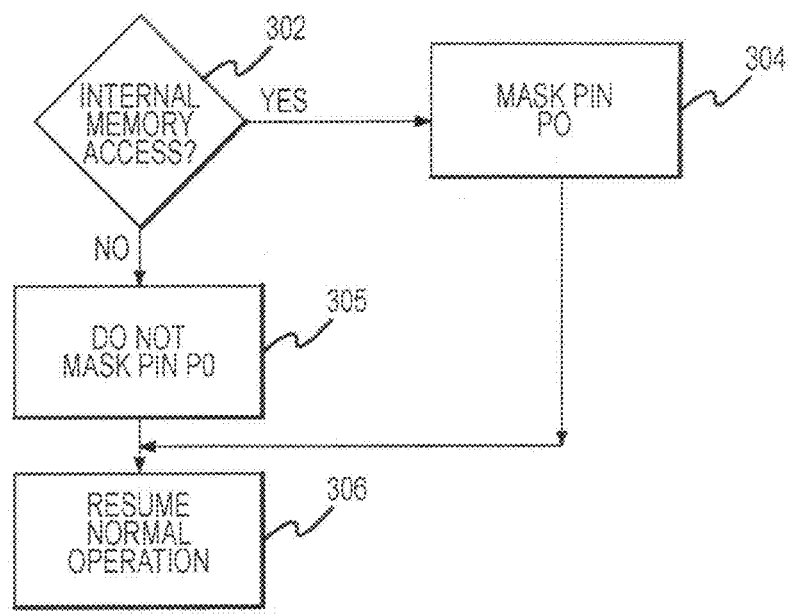
FIG. 3 shows an exemplary method for securing a microcontroller by masking an output pin in accordance with an exemplary embodiment of the present invention.

For example, with reference to FIG. 3, an exemplary method for preventing such unauthorized use is illustrated. Initially, a determination is made to as to whether or not an internal memory access is desired (step 302). If so, then pin P0 is masked such that only zeroes are output on pin P0 (step 304). It should be understood that pin P0 can also be masked to a logical-high state in accordance with other exemplary embodiments. Following masking step 304, operation of the processor continues (step 306). If an external memory access is desired, pin P0 is used in traditional fashion to transmit data and address information (step 305), then operation of the processor continues (step 306). It should be understood that the above-described steps may be carried out upon the execution of any instruction. However, such an execution at every step may result in an unwanted performance reduction. It should be understood that the order of steps is not material and may vary from the order in which the steps are presented in FIG. 3.

Figure 2:
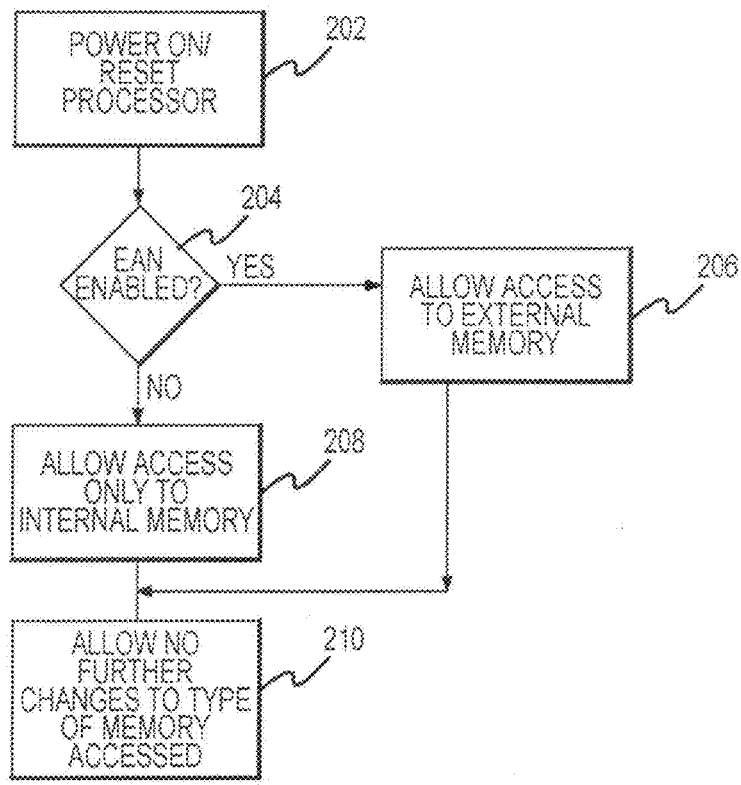
FIG. 2 shows an exemplary method for securing a microcontroller in accordance with an exemplary embodiment of the present invention.
Figure 4:
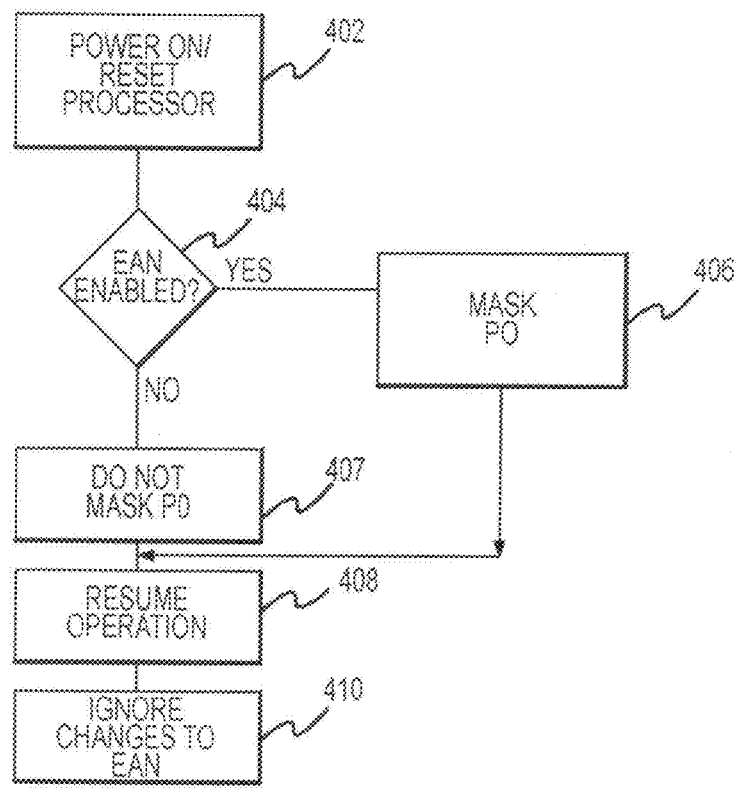
FIG. 4 illustrates a method which combines security methods in accordance with an exemplary embodiment of the present invention.

In accordance with another exemplary embodiment, the feature discussed with respect to FIG. 3 can be combined with the feature discussed in FIG. 2. An exemplary combination of these features is shown in FIG. 4. After power-on or reset (step 402), a determination can be made whether only internal memory will be used by determining the status of EAn (step 404). At that time, if EAn is enabled, pin P0 can be masked to a high or low state (step 406). If it is determined that external memory is used, pin P0 can be configured to operate in the traditional manner (step 407). Regardless of the state of EAn, operation of the processor will resume (step 408) and future changes to the value of EAn will be ignored (step 410). In a controller used with both internal and external memory, the accesses to internal memory can still be masked through the use of an exemplary embodiment of the present invention. Accesses to the external memory remain unmasked. It should be understood that the order of steps may vary from the order in which the steps are presented in FIG. 4. For example, step 410 may be a continuing step.

As described above, another potential security weakness of a processor is the ability to "dump" the contents of the flash memory. In order to prevent such a situation, an exemplary embodiment of the present invention uses a programmable bit within the controller that instructs the controller that the only operation allowed during reprogramming is a mass erase of the contents of the flash memory. In accordance with another exemplary embodiment, a page erase of an individual page of the flash memory is allowed.

Such a feature may be accomplished through the use of a programmable security bit which indicates if flash memory dumps are allowed. In this manner, during debugging, the dumping of flash memory contents is allowed for testing purposes. However, once debugging has been accomplished, a user can turn on the security bit to enable a security mode such that no memory dumps are possible. The security bit is stored in flash memory and is read once, during a power-on/reset.

Thus, unauthorized users are prevented from reprogramming portions of the code, which some may desire to do for nefarious reasons, e.g., to make a device fail. Users are also prevented from dumping the contents of the flash memory into another device for examination and possible duplication. The programmable bit can prevent all accesses to the flash memory except for a mass erase of the entire contents followed by a mass read of new contents. It is important to also mention the erase order during a mass erase. When a mass erase occurs, the internal program is erased first, then the security bit is erased. If the order were reversed, it may be possible for an unauthorized user to power-off the system after the first erase (of the security bit). Then the unauthorized user can power on the system with the security bit cleared and the program running. The unauthorized user would then be able to download the program. However, if the program is erased before the security bit is erased such a situation would be prevented.

Figure 5:
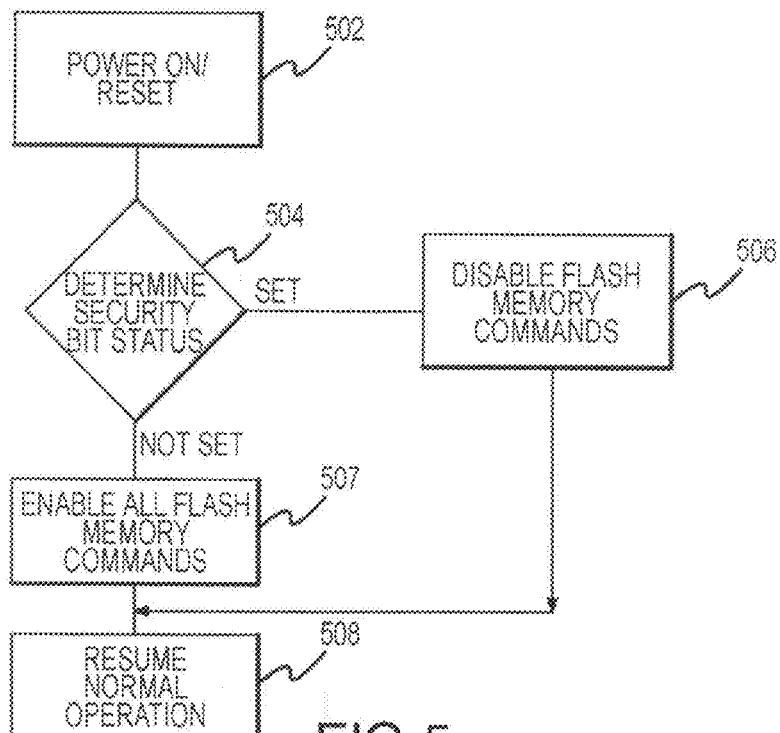
FIG. 5 illustrates a method for securing the flash memory of a microcontroller in accordance with an exemplary embodiment of the present invention.

With reference to FIG. 5, the operation of this exemplary feature will be described in more detail. After power-on/reset (step 502), the microcontroller determines if the programmable security bit is set (step 504). If the programmable security bit is set, flash memory commands are disabled (step 506). It should be understood that it is not necessary for all the flash memory commands to be disabled, as the mass erase of flash memory may still be available. The normal operation of the processor then proceeds (step 508). If the programmable security bit is not set, then the flash memory commands are set. (step 507). Then normal operation of the processor then proceeds (step 508).

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
    a microprocessor core;
    a bus interface that is in communication with the microprocessor core;
    random access memory (RAM) that is in communication with the bus interface;
    power-on reset (POR) circuit;
    an internal memory that is electronically erasable and non-volatile and that in communication with the bus interface, wherein the internal memory includes at least one security bit that at least enables a security mode to prevent access to contents of the internal memory after the POR circuit has asserted a power-on/reset of the apparatus, and wherein the security bit, once set to enable the security mode, is reset when the contents of the internal memory are erased;
    an enable address (EAn) pin that is in communication with microprocessor core, wherein a first state of the EAn pin indicates that instructions are to be fetched from the contents of the internal memory; and
    a memory output port that is in communication with the bus interface, wherein the microprocessor core masks the memory output port when the EAn pin is in the first state.

2. The apparatus of claim 1, wherein the microprocessor core ignores changes from the first state of the EAn pin to another state after the power-on/rest of the apparatus.

3. The apparatus of claim 1, wherein the internal memory is flash memory.

4. The apparatus of claim 1, wherein the apparatus further comprises a read-only memory (ROM) that is in communication with the bus interface.

5. The apparatus of claim 1, wherein the microprocessor core in an 8051 microprocessor core.

* * * * *